United States Patent
Lockridge et al.

(10) Patent No.: US 7,483,451 B2
(45) Date of Patent: *Jan. 27, 2009

(54) MULTI-MEDIA JITTER REMOVAL IN AN ASYNCHRONOUS DIGITAL HOME NETWORK

(75) Inventors: Terry Wayne Lockridge, Indianapolis, IN (US); Thomas Edward Horlander, Indianapolis, IN (US); John William Richardson, Hamilton Square, NJ (US)

(73) Assignee: Thomson Licensing, Boulogne Billancourt (FR)

( * ) Notice: Subject to any disclaimer, the term of this patent is extended or adjusted under 35 U.S.C. 154(b) by 886 days.

This patent is subject to a terminal disclaimer.

(21) Appl. No.: 10/333,172

(22) PCT Filed: Jun. 29, 2001

(86) PCT No.: PCT/US01/20845

§ 371 (c)(1),
(2), (4) Date: Jan. 16, 2003

(87) PCT Pub. No.: WO02/09331

PCT Pub. Date: Jan. 31, 2002

(65) Prior Publication Data

US 2004/0090994 A1    May 13, 2004

Related U.S. Application Data

(60) Provisional application No. 60/219,766, filed on Jul. 20, 2000.

(51) Int. Cl.
*H04J 3/06*    (2006.01)
(52) U.S. Cl. ...................... 370/509; 370/516

(58) Field of Classification Search ............... 370/229, 370/232, 235, 304, 350, 412, 503, 535, 508, 370/509, 510, 512, 513, 516; 375/354, 355, 375/359; 348/500; 379/219; 709/154, 155; 714/731; 713/400, 500, 600
See application file for complete search history.

(56) References Cited

U.S. PATENT DOCUMENTS 5,027,297 A * 6/1991 Garitty et al. ............... 702/187

(Continued)

OTHER PUBLICATIONS

L. Bertoglio et al, "Intermedia synchronization for videoconference over IP", Signal Processing, vol. 15, No. 1-2, Sep. 1999, pp. 149-164.

*Primary Examiner*—Ricky Ngo
*Assistant Examiner*—Gary Mui
(74) *Attorney, Agent, or Firm*—Joseph J. Laks; Paul P. Kiel

(57) ABSTRACT

A method and an apparatus using a system level clocking scheme to remove jitter from multi-media packets distributed over an asynchronous network, in particular an asynchronous network. The present invention overcomes the problems associated with jitter introduced in an asynchronous network by using various time stamps to synchronize a client device clock to a headend clock and to control the data flow in the client device to match the rate that the data is received by a broadband receiver coupled to the headend. A first time stamp is prepended to the transport packets when the packets are received from the headend. A second time stamp is placed in the data frame when the data frame is placed on the network. A third time stamp is placed in the data frame when the data frame is received from the network. The second and third time stamps are used for synchronizing the client clock to the server clock, which is in turn frequency locked to the headend clock. The first time stamp is used for data flow control wherein the client controls the data flow to correspond to the rate the data is received at the server.

18 Claims, 7 Drawing Sheets

U.S. PATENT DOCUMENTS

| | | | |
|---|---|---|---|
| 5,150,363 A | 9/1992 | Mitchell | |
| 5,260,978 A * | 11/1993 | Fleischer et al. | 375/354 |
| 5,467,137 A * | 11/1995 | Zdepski | 375/240.29 |
| 5,473,610 A * | 12/1995 | Rainard | 370/395.62 |
| 5,533,021 A * | 7/1996 | Branstad et al. | 370/396 |
| 5,602,992 A | 2/1997 | Danneels | 395/200.19 |
| 5,652,627 A * | 7/1997 | Allen | 348/497 |
| 5,790,543 A * | 8/1998 | Cloutier | 370/252 |
| 5,822,317 A * | 10/1998 | Shibata | 370/395.62 |
| 5,828,414 A * | 10/1998 | Perkins et al. | 375/240.01 |
| 5,867,488 A * | 2/1999 | Derango et al. | 370/315 |
| 5,907,685 A | 5/1999 | Douceur | |
| 6,069,902 A | 5/2000 | Kurano et al. | |
| 6,335,931 B1 * | 1/2002 | Strong et al. | 370/390 |
| 6,351,821 B1 * | 2/2002 | Voth | 713/600 |
| 6,434,116 B1 * | 8/2002 | Ott | 370/235 |
| 6,449,291 B1 | 9/2002 | Burns et al. | |
| 6,501,743 B1 * | 12/2002 | Kim et al. | 370/324 |
| 6,700,876 B1 | 3/2004 | DiNicola et al. | |
| 6,816,510 B1 * | 11/2004 | Banerjee | 370/503 |
| 6,985,499 B2 | 1/2006 | Elliot | |
| 7,085,261 B2 * | 8/2006 | Ethridge et al. | 370/352 |
| 2001/0022823 A1 | 9/2001 | Renaud | |
| 2001/0030978 A1 * | 10/2001 | Holloway et al. | 370/503 |
| 2002/0027886 A1 * | 3/2002 | Fischer et al. | 370/255 |
| 2002/0131398 A1 | 9/2002 | Taylor | |
| 2004/0010729 A1 * | 1/2004 | Lockridge et al. | 713/500 |
| 2004/0068588 A1 * | 4/2004 | Kowalski et al. | 709/248 |
| 2004/0090994 A1 | 5/2004 | Lockridge et al. | |
| 2004/0177162 A1 * | 9/2004 | Wetzel et al. | 709/248 |

* cited by examiner

MULTI-MEDIA JITTER REMOVAL IN AN ASYNCHRONOUS DIGITAL HOME NETWORK

This application claims the benefit under 35 U.S.C. § 365 of International Application PCT/US01/20845, filed Jun. 29, 2001, which was published in accordance with PCT Article 21(2) on Jan. 31, 2002 in English; and which claims benefit of U.S. provisional application Ser. No. 60/219,766 filed Jul. 20, 2000.

BACKGROUND OF THE INVENTION

1. Field of the Invention

The present invention relates to an asynchronous communications network, and in particular, to an asynchronous multi-media digital home network having a system level clocking scheme to remove jitter from multi-media data packets.

2. Background Information

Recent advances in digital communications technology have increased the viability of digital home networks ("DHN"), which can allow various devices in a home to communicate with each other. In particular, the growing availability of broadband access has made it desirable to be able to tie in various devices in a home to a single gateway device that is coupled to the broadband access for centralized access and distribution of multi-media information. In such a digital home network, the gateway device accesses and buffers multi-media content and distributes the content over the network as requested by various client devices coupled to the network.

Ethernet is a common option for implementing a LAN. Ethernet is an asynchronous collision detect network. HPNA is also an asynchronous collision detect network and some power line based networks are often asynchronous collision detect networks. However, difficulties may arise when such networks are used to distribute multi-media content.

FIG. 1 is a system diagram illustrating a multimedia network. System 100 comprises a plurality of devices 108-113 coupled to media server 103 via one of a plurality of communications networks 105-107. In system 100, media server 103 receives multi-media content via satellite dish 102, buffers the content, and distributes the content as requested from the various devices coupled to the network. Media server 103 may also be coupled to receive multi-media content via any one of plurality of known digital media access methods, including, cable, and DSL. The transfer of data over the selected network is generally achieved by using large buffers or by allowing a client device to throttle data.

In this regard, there are a number of problems associated with taking a live broadcast and distributing it on an asynchronous digital home network. In a live broadcast signal, the data is pushed to the client device, and the client device does not have any control over the incoming data stream. In order to ensure that the networked client device can decode and display all of the audio and video data delivered to it at the correct frame rate, and without repeated or dropped frames, it is in general required that the networked client device be clock synchronized to the network gateway device. The most widely accepted method for clock synchronization in a broadcast A/V network relies on delivering counter samples taken at the broadcast site to the receiver with a fixed delay from the time of broadcast till the time of receipt. The counter at the broadcast site is incremented by the broadcast site's reference clock. At the instant those clock samples arrive in the receiver, a counter clocked by a voltage controlled oscillator (VCXO) is sampled. The value of the counter and the time stamp received from the broadcast site are compared and if the difference between the samples of the local counter and the clock samples taken at the broadcast site varies over time, the voltage applied to the local VCXO is adjusted to try to frequency lock the local clock to the broadcast site's reference clock.

On an asynchronous collision detect network, such as an Ethernet network, the delay from the time a packet is constructed and placed in a transmit buffer until the time the packet is received by a network connected device is not always constant. In such networks, multiple devices colliding on a network can cause variable packet and unpredictable delays in the reception of a packet. In this environment it is not possible to use the method described above to frequency lock the clock at the networked receiver to a clock at the networked transmitter due to the variable and unpredictable delays. Using such a method to attempt to lock the receiver clock to the transmitter clock may produce significant jitter in the receiver clock. Depending upon the magnitude of the jitter in the receiver's clock, it may not be possible to produce an NTSC compliant color burst for video display. In addition, this jitter will at a minimum require the audio and video compressed data buffers to be larger than necessary and at worst cause the buffers to underflow or overflow. The side effects would include video freezing, possible audio chirps and the display colors changing dynamically due to the variations in the color burst.

Some networks, such as 1394 networks, provide isochronous capability that can eliminate this problem. Additionally, various methods, such as SRTS, have also been developed for ATM networks to address these timing issues. The SRTS method assumes that the transmitting device and the receiving device both have access to a network clock for the synchronization. However, such methods may not be completely suitable for correcting jitter in an asynchronous collision detect network, such as an Ethernet network. Therefore, what is desired is a system and a method for synchronizing the clocks and controlling the data flow in an asynchronous network, and in particular, in an asynchronous collision detect network to overcome the above-noted problems.

SUMMARY OF THE INVENTION

The present invention overcomes the jitter problems discussed above, and in particular, provides a system and a method for distributing multi-media content over an asynchronous network. More specifically, the present invention uses time stamps to minimize and reduce the jitter effects caused by software processing and collisions on an asynchronous home network. Time stamps are used to perform synchronization of the clock in the client device to the server clock and also to control data flow in the client device.

One set of time stamps is added for flow control. When a packet arrives from a broadband network, a sample of a local counter in the server is latched into a register. The server attaches the sampled counter value to the received transport packets. The local counter is clocked with a system clock that has been frequency locked to the system clock at the headend. Once a packet is time stamped, the server may place the packet in a transmit buffer. This time stamp indicates the moment at which the data was received from the broadband connection and placed into a buffer, and as such, can be used by the client device to remove the data from a receive buffer at the exact same rate as it entered the buffer.

Another set of time stamps is used for synchronizing the client device clock with the head end clock. At the moment a frame of data is being placed onto the network, a local counter running on the system clock is sampled. A time stamp based on the sampled clock is placed in the data frame in real-time at the physical layer of the network so that there is a fixed and constant amount of time from the sampling of the local counter and the sampled count value being placed onto the network. If a collision occurs, the time stamp is updated when the data is retransmitted. At the moment the new data frame is received in the physical layer of a client device, a sample of a local counter running on the client's local clock is latched into a register. This "receive-time" time stamp is then attached to the received frame of data and passed onto successive layers of the client's network protocol hardware and software. After the client data is passed through the communication protocols, the data is ready to be used by the client.

The client device uses the time stamps attached at the physical layer of the server's network interface, along with the time stamps that were attached when the data was received by the client device to lock the client's local system clock to the server's local system clock. Since the server's local system clock is frequency locked to the headend system clock, the client system clock will also be frequency locked to the headend system clock. Frequent clock samples from the server will allow the client's system clock to very closely track the server's system clock.

The time stamps attached to the data when the data arrived at the server from the broadband network may then be used to determine the exact time when each data packet should be extracted from the client's buffer and passed on to the audio/video subsystems in the client. In this way the packet arrival timing at the server is exactly matched at the input to the A/V subsystem in the client device.

BRIEF DESCRIPTION OF THE DRAWINGS

The invention is described with reference to the drawings, wherein.

DETAILED DESCRIPTION OF THE PREFERRED EMBODIMENTS

Figure 1:
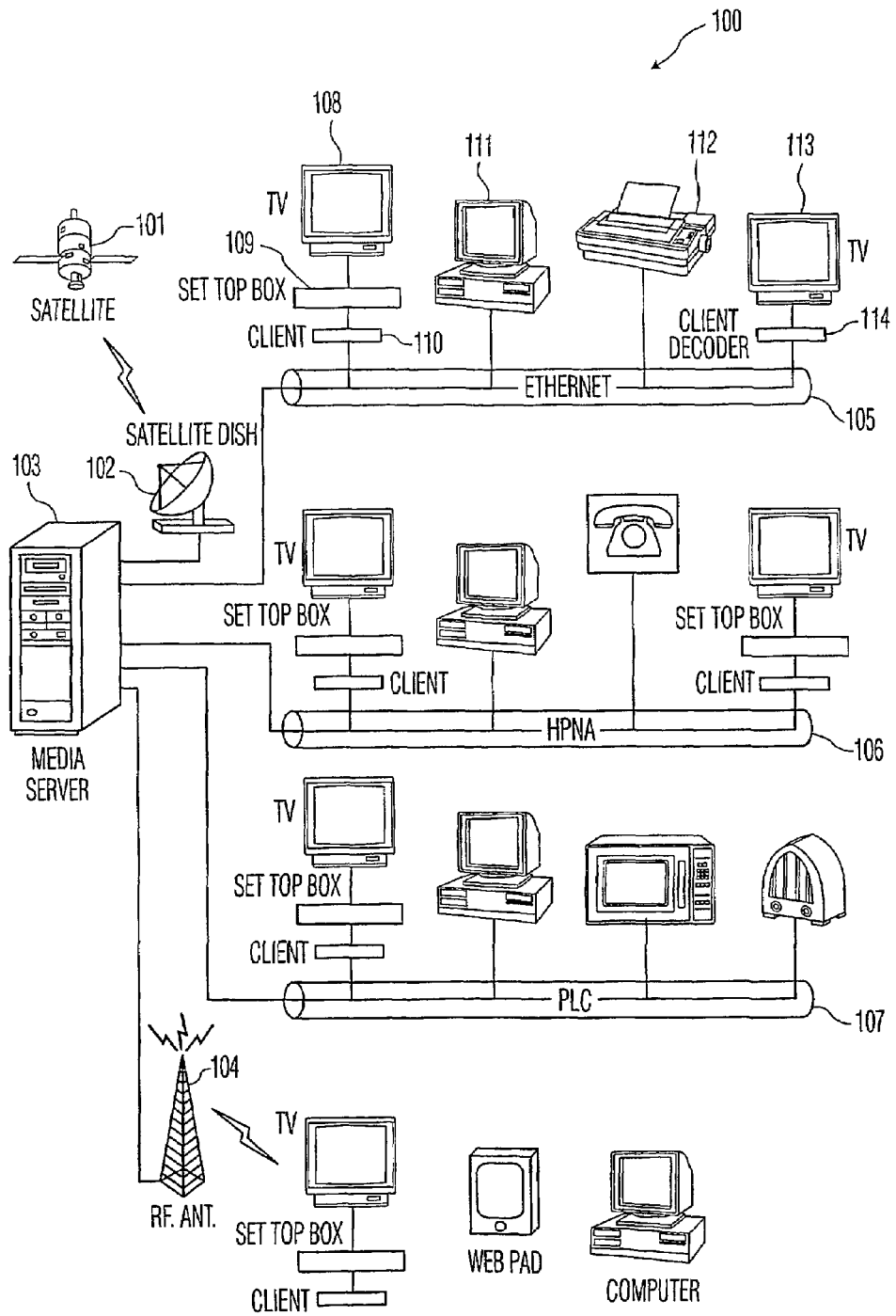
FIG. 1 shows an asynchronous multi-media network including a media server coupled to a plurality of client devices.
Figure 2:
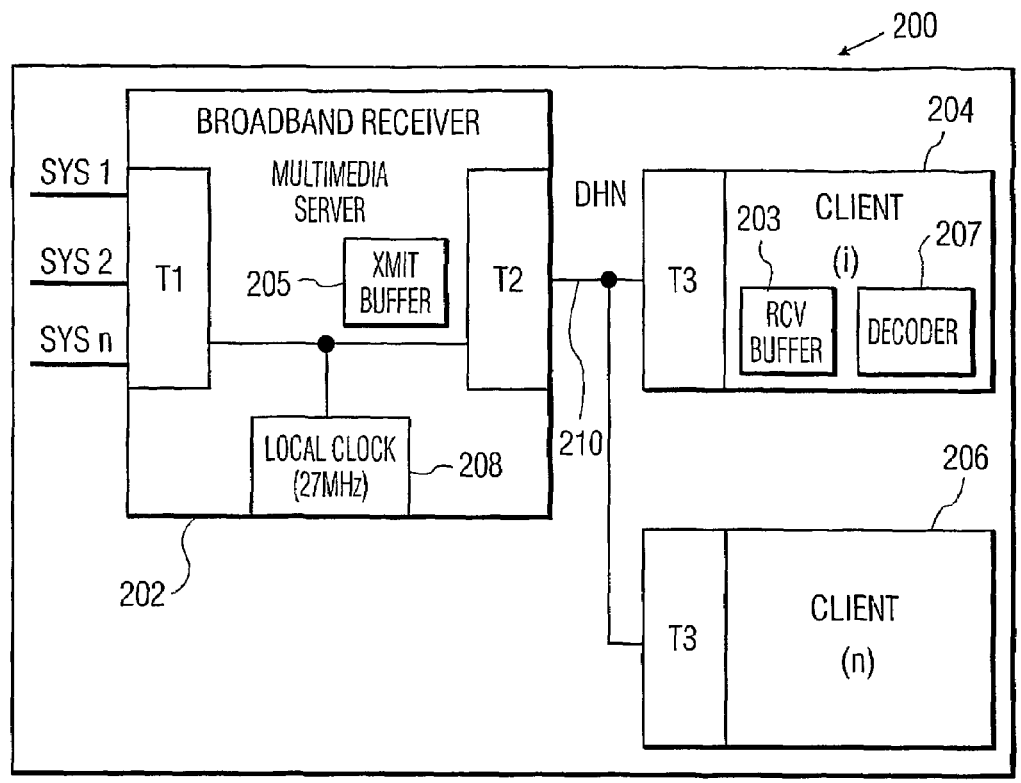
FIG. 2 is a block diagram illustrating the elements of an asynchronous multi-media network including time stamps placed into the data at various points of the network according to the present invention.

FIG. 2 illustrates a digital home network utilizing the time stamps according to the present invention. The broadband input signal is provided by a headend (not shown) and received by broadband receiver/multi-media server 202. Server 202 may be configured to receive the input from one of a plurality of broadband sources, such as, satellite, cable or DSL, as indicated by input Sys 1, Sys 2 . . . Sys n. This input signal may be in the form of transport packets, which include System Clock Recovery (SCRs) information used by receiver 202 to frequency lock its local system clock to the head end system clock. The SCRs are used to mange buffer levels and to derive video timing and color burst signals in an integrated receiver decoder (IRD). It is important to note that the SCR information and packet timing relationships must be maintained throughout system 200, from entry into the network to the point of final presentation, in order for system 200 to operate properly.

Data received by server 202 from the broadband network is transport packetized. Some of these transport packets will carry samples from a counter at the head end that is clocked by the head end's system clock. Using these counter samples and the arrival time of the transport packets that carry these samples, server 202 is able to frequency lock its own local system clock to the head end system clock.

In accordance with the present invention, in order to ensure that the exact arrival time of packets at the client device may be reproduced, each packet arriving from the broadband network is stamped with a time stamp, T1, when server 202 receives the packet. Time stamp T1 is a sample of a local counter that is clocked with a local system clock of server 202. Time stamp T1 and the packet are stored together in buffer 205 prior to being broadcast together over the DHN.

At some later point in time, a group of transport packets, along with header information, is assembled to form a data frame for transmission on the network DHN. The moment the data frame starts to be placed onto the network, local counter in server 202, running on the local system clock, is sampled to generate a counter sample time stamp T2. Time stamp T2 is prepended onto the beginning of the outgoing data frame such that the time from sampling the counter value to the time the counter value enters the network is fixed and constant. It is important that this time is fixed and constant, and for this reason the counter sampling and time stamp placement is performed in the physical layer hardware of the network interface. Since the propagation delay from server 202 to client device 204 over the network is fixed and constant, the overall propagation delay from sampling T2 until the packet containing time stamp T2 arrives at client device 204 is also fixed and constant. Additionally, in a network where the symbol times may change, the present invention is able to provide synchronization as long as the propagation times remain constant.

At the moment the data frame arrives at client device 204, a local counter of client device 204, running on the client system clock, is sampled to generate a time stamp T3. This counter value is compared to time stamp T2 in the arriving data frame to ensure that the difference between the client counter and the server counter is not changing. If this difference is changing over time, the client device will modify the voltage on its local VCXO to move its local system clock into frequency lock with the system clock of server 202. Thus, time stamps T2 and T3 are used to frequency lock the system clocks of server 202 and client device 204 together. Time stamps T2 and T3 may be discarded after they are used in client device 204 for synchronization. At this point, data frames that encapsulate transport packets and their associated time stamps T1 may be stored in buffer 203 in client device 204.

Figure 3:
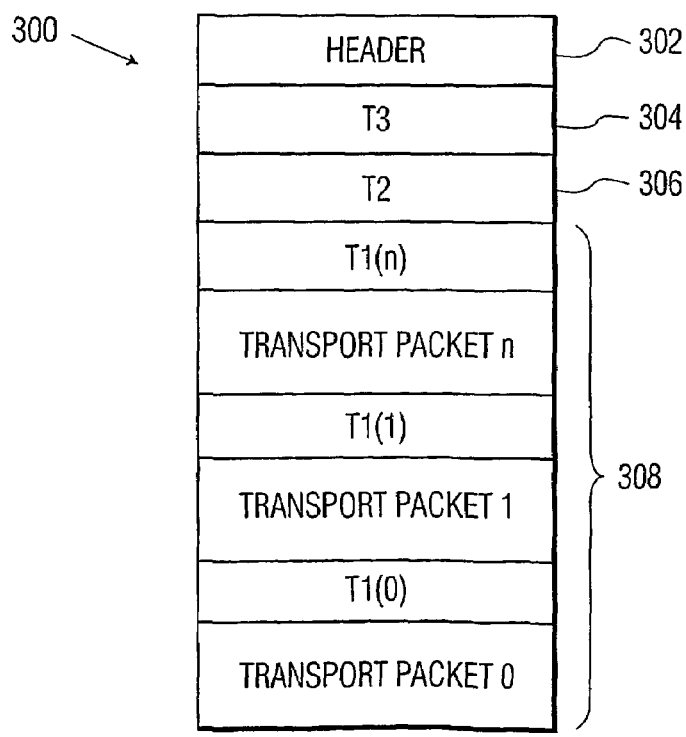
FIG. 3 shows format of the data frame including the time stamps utilized in the asynchronous multi-media network according to the present invention.

The next step is to remove data from the buffer of client device 204 at a rate that exactly matches the rate at which the packets arrived at the input of server 202. When client device 204 has accumulated enough data in a receive buffer to absorb a reasonable amount of network jitter client device 204 starts extracting data from the receive buffer, and making that data available to the decoders within client device 204. A local counter, which is based on the client clock is initialized with the count value stored with the first transport packet to be extracted from memory. The counter is clocked with the client's system clock, which is locked to the server clock, so the subsequent packets may be extracted from memory when their stored time stamp value matches the counter value. In this manner, the rate of removal from the receive buffer of client device 204 matches the rate at which the data was received at server 202. The format of the data packet and placement of the time stamps T1, T2 and T3 within the data frame are shown in FIG. 3, wherein the time stamps T1 are generated as the packetized data is received and time stamps T2 are placed into the data frames as the frames are placed on the network DHN and time stamp T3 is generated when the data frame is received from the network DHN.

The format of the data packets and the placement of the times stamps into the data frames in an Ethernet environment are further described below. The Ethernet packets in the present embodiment use the UDP/IP protocols, but it is to be understood that other suitable protocols, such as TCP, or "raw" Ethernet may be used to implement the time stamping features of the present invention. In accordance with the present invention, the IP header utilizes an IP option identifying the data frames that need to have a time stamp placed therein. The time stamps are placed in the data frames following the UDP header. There is a unique location in the extended UDP header for the outgoing and incoming packets.

The clock synchronization time stamps T2 and T3 are placed after the UDP header. Time stamp T2 is a 32-bit time stamp and is applied when the IP packet has an option 25 set. The time stamp placed into the data frame at the physical network layer. Although the present embodiment utilizes option 25 to indicate the presence of time stamps in the frame, it is to be understood that other suitable method for indicating time stamps, such as designating specific IP address and port number may be utilized.

Time stamp T3 is also a 32-bit incoming time stamp and is applied when an IP packet with option 25 is detected. This time stamp is also placed into the data frame at the physical network layer. Table 1 below shows the placement of time stamps T2 and T3 in the UDP data frame.

TABLE 1

UDP data frame

| 0              15              | 16              31         |
|--------------------------------|----------------------------|
| 16-bit source port number      | 16-bit destination port number |
| 16-bit UDP length              | 16-bit UDP checksum        |
| 32-bit time stamp T2           |                            |
| 32-bit time stamp T3           |                            |
| Data (if any)                  |                            |

Using the time stamps at the physical layer, the present invention can develop an algorithm to synchronize the two independent nodes, in this case server 202 and client device 204.

The data flow control time stamps T1 are placed into the data stream when the data is received from a broadband network. Time stamps T1 are generated using a local counter in server 202 that is incremented by a clock that is frequency locked to the system clock at the headend. By placing a time stamp T1 on each transport packet as the packet arrives at server 202, client device 204 can reproduce the same bit rate as the rate received at server 202. Data flow control time stamps T1 are placed in the UDP payload. Table 2 shows the data format used in the exemplary embodiment of the present invention. This data is placed in the data portion of the UDP data frame shown in table 1.

TABLE 2

Data including transport packets and time stamps

| 0         15         16         31 |
|--------------------------------------|
| Transport Packet Marker              |
| 16-bit MSBs of time stamp T1 (0)     |
| 16-bit LSBs of time stamp T1 (0)     |
| Transport Packet 0                   |
| Transport Packet Marker              |
| 16-bit MSBs of time stamp T1 (1)     |
| 16-bit LSBs of time stamp T1 (1)     |
| Transport Packet 1                   |
| .                                    |
| .                                    |
| .                                    |
| Transport Packet Marker              |
| 16-bit MSBs of time stamp T1 (n)     |
| 16-bit LSBs of time stamp T1 (n)     |
| Transport Packet n                   |

Once the data frame has been time stamped, the UDP checksum is checked. If the checksum is not zero, the old checksum is replaced with a newly created checksum. After resolving the UDP checksum, a new CRC is calculated and replaces the old CRC value in the MAC layer. If at any point of the packet interrogation it is determined that the data frame is not a valid time stamp frame, the frame is passed through with no alterations to the data.

The time stamp value is generated from an external system clock. The external clock drives a 32-bit counter. A snapshot of the counter is taken when a data frame is placed onto the network. On an incoming packet, a snapshot of a counter in the client device is taken. If it is a valid time stamped packet, the snapshot of the counter is placed into the payload portion of the data frame. The 32-bit counter is a free running rollover counter synchronous to the external system clock.

The following describes the search sequence to determine whether a particular data frame needs a time stamp, and if so, where the time stamp data is placed. The first test is to validate the MAC frame. Validating the MAC frame requires the CRC to be calculated and compared. If the CRC test fails, the frame is allowed to pass through without any modifications to ensure that a valid CRC is not added to a data frame that was received with an invalid CRC. If the CRC test is passed, a second test is conducted to find an Internet Protocol (IP) in the MAC frame. Twenty octets into the MAC frame, from the 802.3 specification section 3.2.6, Length/Type, is the Length/Type field. From ITEF RFC 1700 EtherTypes table, an Internet IP (Ipv4) is 0x800 (Hexadecimal). If the value is not 0x800, the packet is passed through. If the Length/Type is 0x800, another test is conducted to determine the size of the IP header and whether it contains an UDP packet. The contents of a MAC frame are specified in IEEE 802.3, section 3.1.1.

If the MAC frame contains an IP packet, the next test determines the size and the option settings. First, in order to determine the size, the second nibble of the IP packet, which is the Header Length, is examined. The Header Length is the number of 32-bit words that make up the IP header. Without options, the IP header is normally 20 bytes, so the Header Length is 5. The IP Header options have a 20 decimal offset from the start of the IP Header.

The steps to determine whether the packet is a valid time stamp packet is now described. If any of the steps fail, the packet is passed through without any modifications. First, the header length field is examined to determine whether it is greater than 5. If so, the $1^{st}$ IP option located 20 bytes from the beginning of the IP Header is checked against 0x99040000. The format of the option is shown in Table 3 below:

TABLE 3

IP Option 25

| Copy (1 bit) | Class (2 bits) | Number (5 bits) | Length (8 bits) | Parm (16 bits) |
|---|---|---|---|---|
| 1 | 0 | 25 | 4 | 0 |

Table 4 shows an IP header with IP option 25 included.

TABLE 4

IP Header with IP Option 25

| 0 4-bit version | 15 4-bit header length | 16 8-bit type of service (TOS) | 31 16-bit total length (in bytes) | |
|---|---|---|---|---|
| 16-bit identification | | | 3-bit flag | 13-bit fragment offset |
| 8-bit time to live (TTL) | 8-bit protocol | | 16-bit header checksum | |
| 32-bit source IP address | | | | |
| 32-bit destination IP address | | | | |
| 32-bit option 25 data | | | | |

If the IP options include the designated time stamping option described above, the present system places a time stamp into the data frame. The time stamps are placed in the UDP payload portion that follows the IP header, and in particular, at the beginning of the payload portion. The UDP header is 8 bytes long. The first 32 bit word of the UDP payload is reserved for time stamp T2, the outgoing time stamp, and the second 32 bit word of the UDP payload is reserved for T3, the incoming time stamp. Table 1 shows the general format of the UDP data frame while table 2 illustrates the specific format chosen for the exemplary embodiment of the present invention.

A significant aspect of the present invention is that the time stamps and the CRC are generated and placed into the data frames at the physical layer. As such, the time stamps and CRC are placed into the data frames as the data frames are actually being placed onto the network or are received from the network. This allows the time stamps to accurately reflect the time the data enters the network and the time the data is received from the network.

The elements of a system for implementing the time stamping described above is now described in further detail with respect to a DBS receiver. However, it is to be understood that similar time stamping may be performed for multi-media data received on other types of broadband networks, such as DSL or cable.

Figure 4:
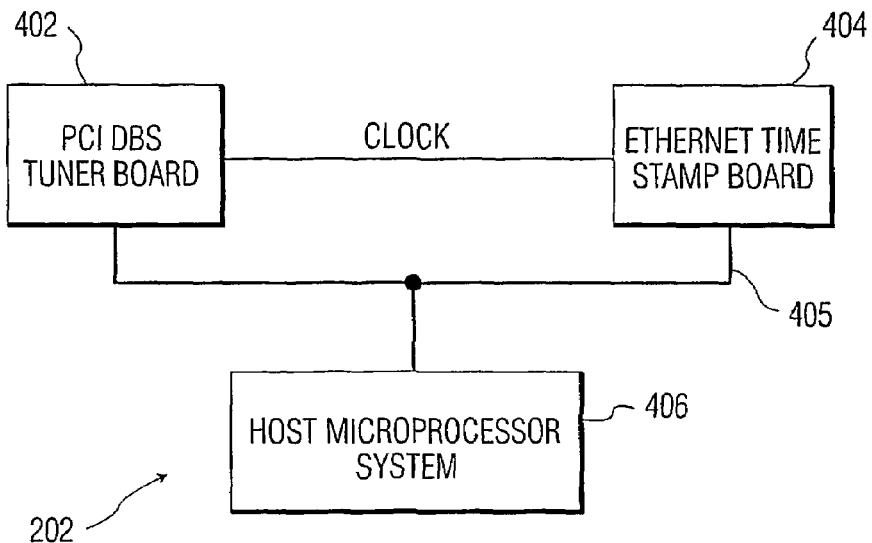
FIG. 4 is a block diagram illustrating the element of a broadband receiver adapted to receive satellite signals.

As shown in FIG. 4, server 202 consists of three functional blocks connected by a bus. The satellite signal is received by server 202 through PCI DBS tuner 402. Host controller 406 reads the transport packets from the satellite signal out of PCI DBS tuner 402 via PCI bus interface 405. Host controller 406 then processes the data and sends the processed data out to time stamp board 404 via well-known protocols, including UDP. Also, PCI DBS tuner 402 and time stamp board 404 have a common clock between them. The clock is generated on PCI DBS tuner 402, and used as the time reference for time stamp board 404.

In operation, host controller 406 reads the transport packets out of the FIFO memory of PCI DBS tuner 402. The packets are then processed according to the network protocol software and the network frames are then written into the Ethernet MAC of time stamp board 404. The MAC waits for the Ethernet Network to become available, and then sends the data through a time stamp controller to an Ethernet PHY. When a video network packet is detected by the time stamp controller, a time stamp is added to that packet. The time stamp T2 is a sample of a counter in the time stamp controller that is clocked by a recovered clock source. In server 202, the clock source for the time stamp controller is a VCXO in PCI DBS tuner 402.

Figure 5:
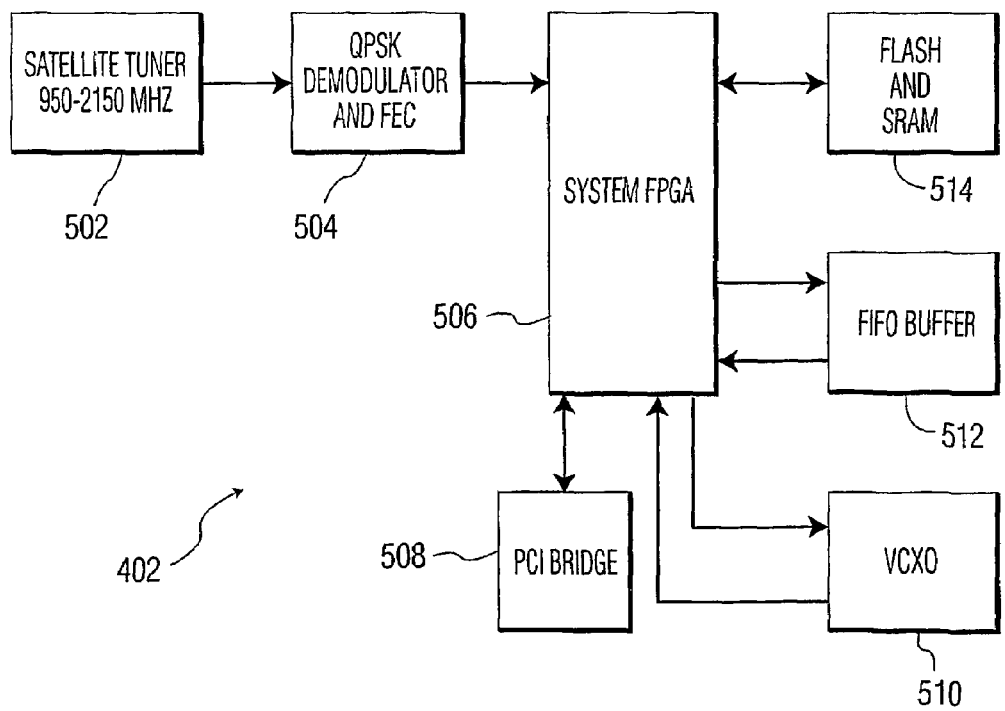
FIG. 5 is a block diagram illustrating the elements of the PCI DBS tuner board illustrated in FIG. 4.

FIG. 5 shows a block diagram of PCI DBS tuner 402. PCI DBS tuner 402 performs three major functions. First, PCI DBS tuner 402 ensures that the correct satellite transponder is selected, tuned, and demodulated. This is accomplished by satellite tuner 502 and demodulator 504. These devices perform the well-known conversion of a satellite signal into a digital transport stream.

Second, PCI DBS tuner 402 filters the packets of the transport stream. Tuner controller 506 contains logic to filter out only the transport packets requested by host controller 406. The transport packets are then stored in FIFO buffer 512. Host controller 506 can then read the packets out of FIFO buffer 512 via PCI bus interface 405. In order to facilitate the PCI bus interface, a PCI bridge chip 508 is used.

Third, PCI DBS tuner 402 performs clock recovery. Tuner controller 506 executes software instructions from Flash and SRAM 514. A software control loop is created to adjust the frequency of Voltage Controlled Crystal Oscillator ("VCXO") A counter running from VCXO 510 clock is sampled each time a packet containing a time stamp from the service provider's head end. Tuner controller 506 compares the normalized error in VCXO 510 clock to the headend clock. This way, the local clock can be adjusted to be the same frequency as the headend clock.

Additionally, time stamps T1 can be added to each transport packet using the recovered system clock from VCXO 510. Time stamp T1 is based on a sample of the local counter at the moment the packet is received at tuner 402.

Figure 6:
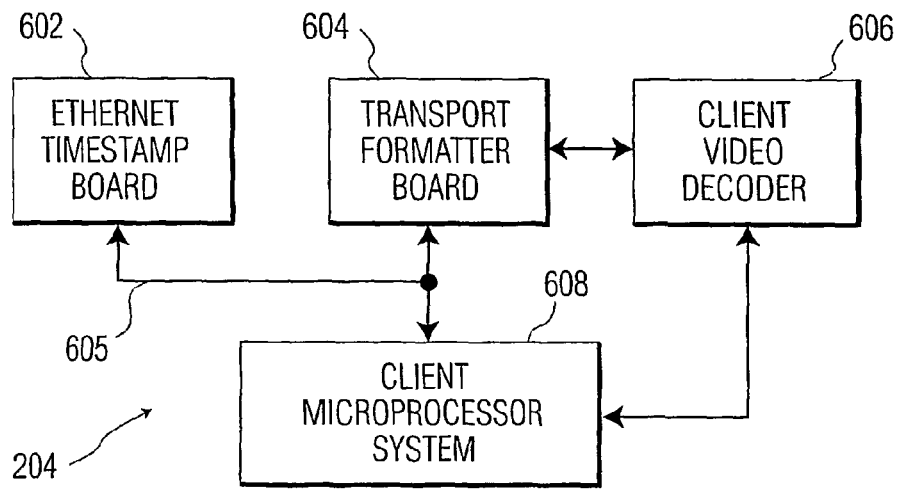
FIG. 6 is a block diagram illustrating the elements of the client device illustrated in FIG. 2.
Figure 8:
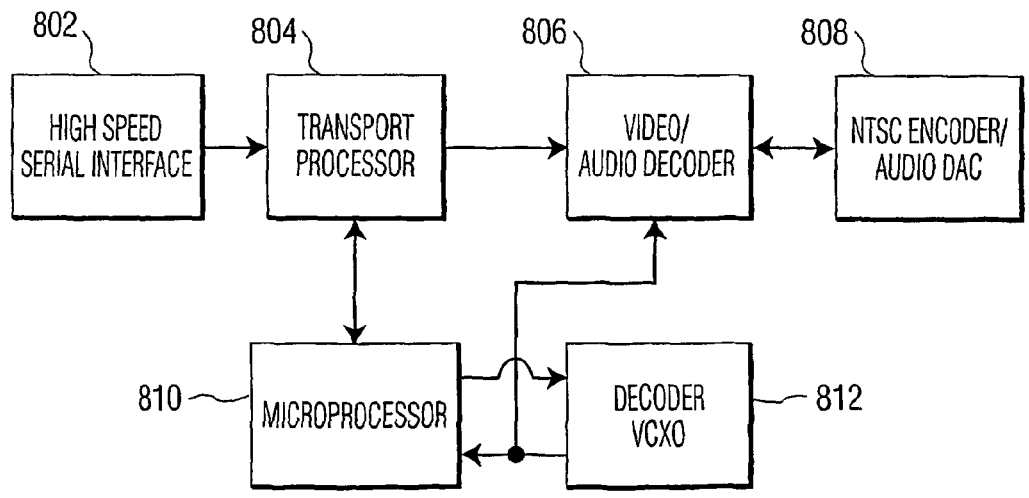
FIG. 8 is a block diagram illustrating the elements of the client video decoder illustrated in FIG. 6.

The elements of network client 204 are shown in FIG. 6. Data arrives at the client's time stamp board 602, and time stamp T3 is added to the data frame at the moment of arrival. The packets are processed by client controller 608, which is connected to time stamp board 602 via PCI bus 605. The transport packets are extracted from the network frames, and are then written to transport formatter board 604. The output of transport formatter 604 is a serial transport stream that may be used by decoder 606. The output of decoder 606 is connected to a television or other display device. FIG. 8 shows the elements of decoder 606.

Client controller 608 is responsible for executing a clock recovery algorithm. The data frame departure times T2 from server 202 are compared to the arrival times T3 at client 204. In this manner, client controller 608 can determine whether decoder VCXO 812 is faster or slower than server VCXO 510. Client controller 608 sends commands to decoder controller 810 to speed up or slow down decoder VCXO 812 through a low speed serial (RS-232) connection.

The time stamp board of the client device is similar to the time stamp board of the server device except that the recovered clock source in the client device is derived from the clock of decoder 606 rather than VCXO 510 of PCI DBS tuner 402.

Figure 7:
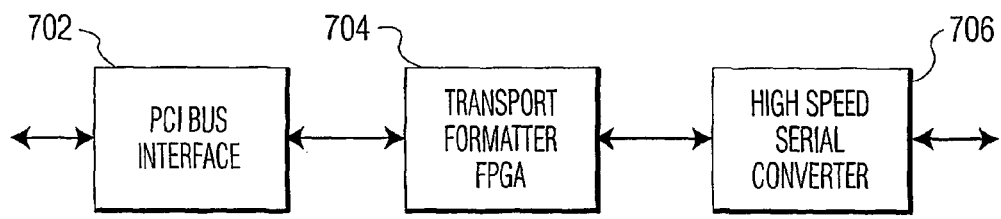
FIG. 7 is a block diagram illustrating the elements of the transport formatter board illustrated in FIG. 6.

The elements of transport formatter 604 are shown in FIG. 7. Transport formatter 604 is connected to client controller 608 via PCI bus 702. A PCI bus interface converts the PCI bus to a standard local bus, which is connected to transport formatter controller 704. Transport formatter controller 704 outputs a serial transport stream at TTL logic levels. High speed serial converter 706 circuit converts those signals to low voltage differential signals, which are passed to decoder 606.

Transport formatter controller 704 has two modes of operation. The first is flow control mode in which transport packets are forwarded to decoder 606 according to the optional time stamps added by tuner controller 506 of PCI DBS tuner 402. In this manner, the relative transport packet departure times from transport formatter 604 match the transport packet arrival times at tuner controller 506. This has the effect of making the packet timing at the input of decoder 606 appear to be connected directly to tuner 502 and demodulator 504 of PCI DBS tuner 402.

The second mode of operation allows the data to flow immediately from transport formatter controller 704 to decoder 606. In this mode, decoder 606 is required to buffer the data internally. This requires decoder 606 to contain more memory than the first mode.

Data arrives from transport formatter 604 into high speed serial interface 802 of decoder 606. Transport processor 804 sorts the incoming transport packets and puts them into the correct buffer (video, audio, program guide, other data, etc.). The video and audio data are decompressed in the video/audio decoder 806. After that, decompressed digital data is converted to analog NTSC signals via NTSC encoder/audio DAC 808.

The time stamping board used in implementing the present time stamping method is now further described. Although, described with reference to the time stamping board associated with server 202, as noted above, the time stamping board associated with client 204 is similar. Time stamping board 404 is a PCI Ethernet NIC that can support both 10 Mb/s and 100 Mb/s data rates. It is capable of resetting the UDP check sum and placing 32-bit time stamps in the data frames, as well as recalculating the CRC for the designated data frames. The external interfaces allow board 404 to be integrated into PC PCI or embedded PCI architectures. An external clock interface is provided to generate time stamp values.

Figure 9:
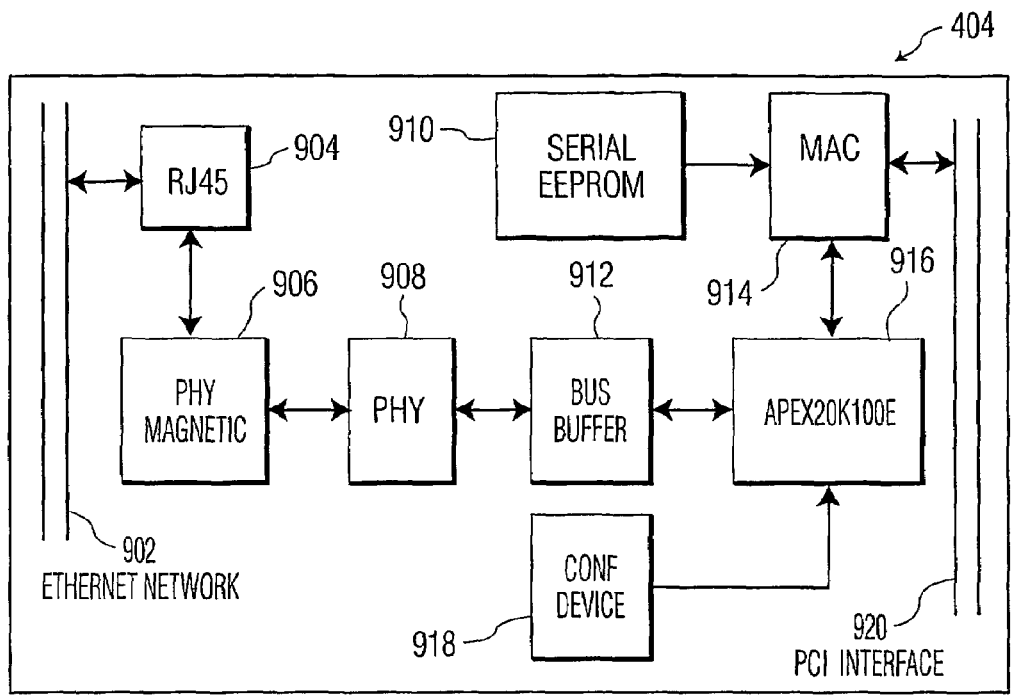
FIG. 9 is a block diagram illustrating the time stamping board used in the asynchronous multi-media network according to the present invention.

FIG. 9 illustrates a block diagram of time stamping board 404. The time stamping board comprises an input jack 904, for example RJ45, coupled to Ethernet network 902. Input jack 904 is coupled to 10/100 Base-TX Phy transformer 906. Transformer 906 is coupled to physical layer device 908, which is a full feature physical layer device with integrated PMD sublayers to support both 10BASE-T and 100BASE-X Ethernet protocols. Physical layer device 908 is coupled to bus buffer 912, which translates the voltage levels between physical layer device 908 and time stamp controller 916. Bus buffer 912 is a low voltage CMOS octal bus buffer. It is ideal for low power and high-speed 3.3V applications and can be interfaced to 5V-signal environment for both inputs and outputs. Bus buffer 912 is coupled to time stamp controller 916, which controls and performs much of the time stamping functions, including, resetting the UDP check sum, placing the time stamps and recalculating the new CRC for the valid data frames in both the receive and transmit directions.

Time stamp controller 916 is coupled to configuration device 918, which stores and loads the program to operate time stamp controller 916. Time stamp controller 916 is also coupled to Ethernet MAC unit 914, which is a LAN controller for both 10 Mb/s and 100 Mb/s data rates. Ethernet MAC 914 provides a direct interface to the peripheral component interconnect (PCI) local bus or the CardBus.

Figure 10:
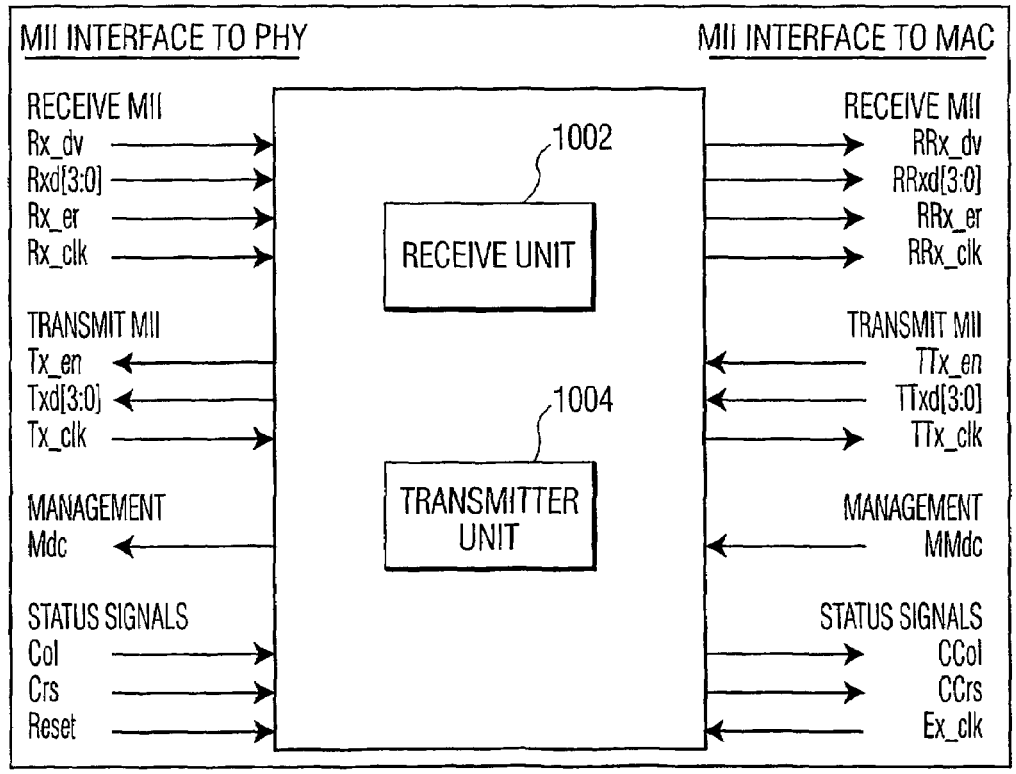
FIG. 10 is a block diagram illustrating the time stamp controller in the time stamping board shown in FIG. 9.

Time Stamp controller 916 provides the MII interfaces to the PHY and the MAC. As shown in FIG. 10, controller 916 consists of receiver unit 1002 and transmitter unit 1004. The two units are implemented separately, but share the same external system clock and the reset signal.

Figure 11:
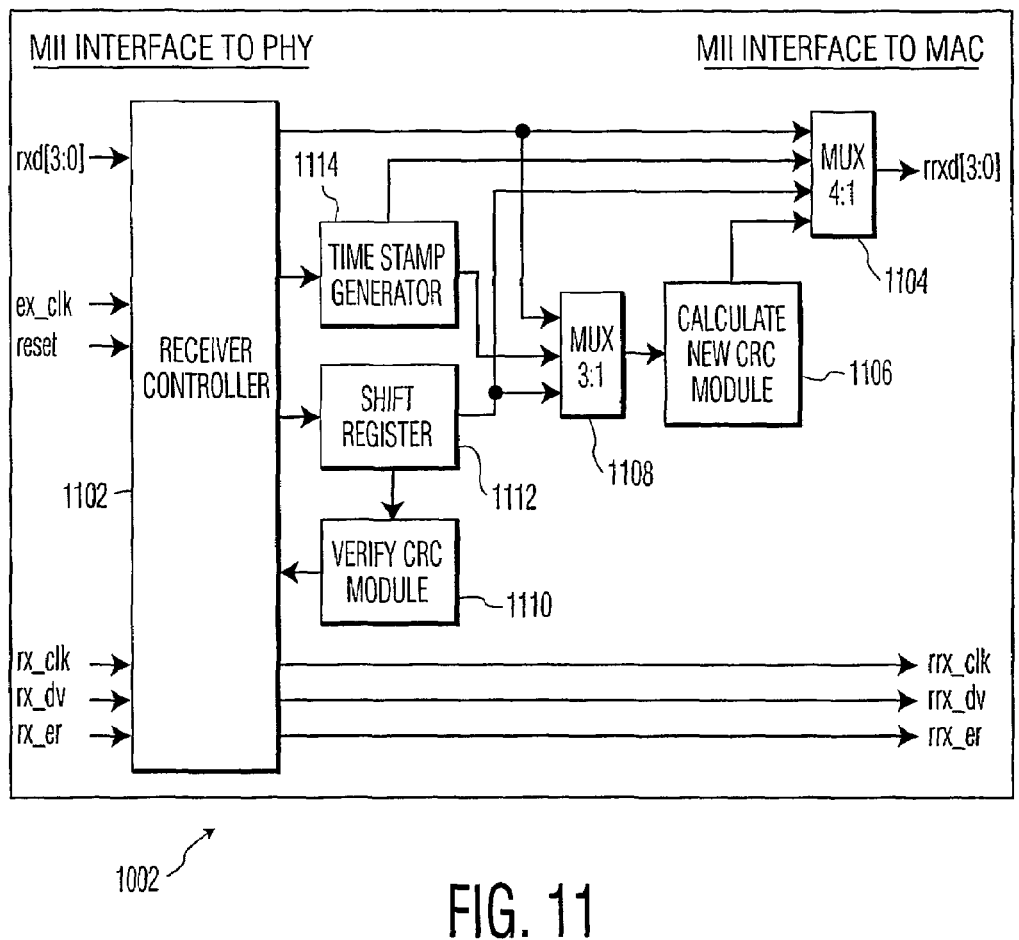
FIG. 11 is a block diagram illustrating the receiver unit in the time stamp controller shown in FIG. 10.

As shown in FIG. 11, receiver unit 1002 comprises receiver controller 1102, time stamp generator 1114, shift register 1112, verify CRC module 1110, calculate new CRC module 1106, 3:1 MUX 1108 and 4:1 MUX 1104. Receiver controller 1102 detects the status of data stream to enable the 3:1 MUX and the 4:1 MUX for appropriate output data (receive data, reset UDP check sum, time stamp, new CRC).

Calculate new CRC module 1106 calculates the CRC check sum for the modified data stream (Ethernet packet which has time stamp and reset UDP check sum), this new CRC will be placed into the modified data stream before it arrives at the MAC. The difference of receiver unit 1002 to transmitter unit 1004 is that receiver unit 1002 included verify CRC module 1110. It is necessary to verify the CRC on packets that are received, due to the fact that this data may have been corrupted on the medium. If the CRC is not correct, this indicates that the data has indeed become corrupted. Instead of adding a new, correct CRC to the data, the data is allowed to pass through to the MAC with an incorrect CRC.

Controller 1102 synchronizes and controls the operations of all modules and components. Two clocks are used: a receive clock and an external system clock. The time stamp is generated by the external clock and latched into the receive clock domain at the start of every packet. Data is received from the PHY and the appropriate data (receive data, reset UDP check sum, time stamp, new CRC) is transmitted to the MAC in accordance with IEEE 802.3. When the data is received, the time stamp T3 is placed in the appropriate area and a new CRC is calculated and replaces the old CRC value in the MAC layer. Again, a significant aspect of the present invention is that the time stamps and the CRC are generated and placed in the data frames at the physical layer as the data frame is received from the network. As such, the time stamps and the CRC, which reflect the actual time the data frames are received from the network, are quickly and efficiently placed in the data frames as they move to the MAC layer. If at any point of the packet interrogation it is determined that the data frame is not a valid time stamp frame or there are errors while receiving, the data frame is allowed to pass through with no alterations to the data.

Figure 12:
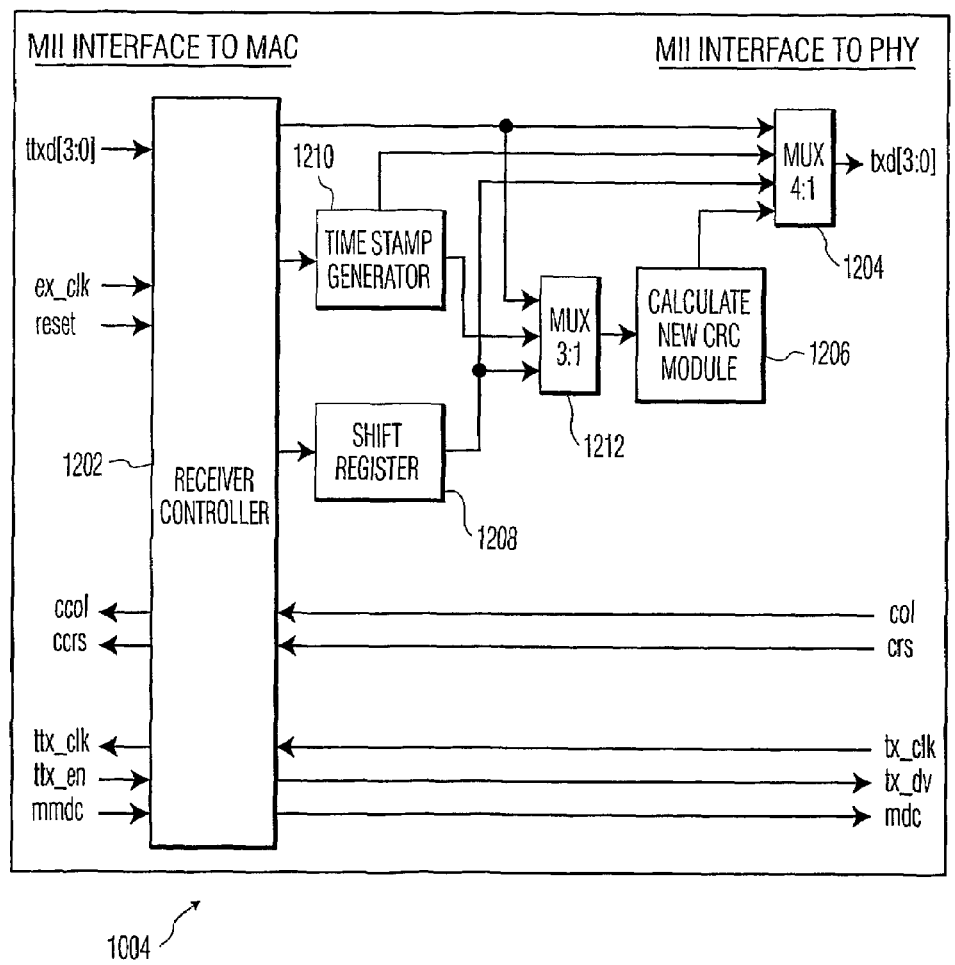
FIG. 12 is a block diagram illustrating the transmitting unit in the time stamp controller shown in FIG. 10.

As shown in FIG. 12, transmitter unit 1202 comprises transmitter controller 1202, time stamp generator 1210, shift register 1208, calculate new CRC module 1206, 3:1 MUX 1212 and 4:1 MUX 1204. Transmitter controller 1202 controls the operations of all modules and components for each appropriate process. Two clocks are used: a transmit clock and an external system clock. The time stamps are generated by the external clock and latched into the receive clock domain at the start of every packet. Here again, the time stamps are generated and placed into the data frames at the physical layer.

While this invention has been described as having a preferred design, the present invention can be further modified within the spirit and scope of this disclosure. For example, the time stamping features may be implemented in other asynchronous networks, including, but not limited to, HPNA, PLC, and certain wireless networks, for example IEEE 802.11b. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A server apparatus for receiving packetized multi-media data and transmitting the packetized multi-media data over an asynchronous network, the server apparatus comprising:
   an input for receiving the packetized multi-media data from a signal source, the packetized multi-media data including synchronizing information;
   a clock;
   a controller, coupled to the input and the clock, for synchronizing the clock to a clock associated with the signal source in response to the synchronizing information, the controller generating first time stamps in response to the receipt of the packetized multi-media data, each one of the first time stamps being indicative of a time a respective multi-media data packet is received at the input, the controller further generating data frames having the packetized multi-media data and the first time stamps included therein;
   an output, coupled to the asynchronous network, for transmitting the data frames to a client device;
   a time stamping device, coupled to the controller, the clock and the output, for placing a second time stamp in each one of the data frames, the second time stamp being indicative of a time the respective data frame is placed onto the asynchronous network, wherein the client device controls a data flow rate in the client device to correspond to a rate that the packetized multi-media data is received at the input of the server apparatus in response to the first time stamps and synchronizes a clock associated with the client device with the clock associated with the server apparatus in response to the second time stamps.

2. The server apparatus according to claim 1, wherein the client device adds a third time stamp to each one of the data frames, the third time stamp being indicative of a time the respective data frame arrives at the client device, the client device comparing the second time stamps with the third time stamps to synchronize the clock associated with the client device with the clock associated with the server apparatus.

3. The server apparatus according to claim 2, wherein the asynchronous network is an Ethernet network.

4. The server apparatus according to claim 2, wherein the asynchronous network is an HPNA network.

5. The server apparatus according to claim 2, wherein the asynchronous network is a PLC network.

6. The server apparatus according to claim 2, wherein the asynchronous network is a wireless network.

7. The server apparatus according to claim 1, wherein each one of the data frames comprises a data frame header, a time stamp data portion for accepting the corresponding second time stamp, and a data portion for accepting the packetized multi-media data and the corresponding first time stamps.

8. The server apparatus according to claim 7, wherein the time stamp data portion includes a first time stamp data portion for accepting the second time stamp and a second time stamp data portion for accepting a third time stamp added by the client device.

9. A method for transmitting packetized multi-media data over an asynchronous network, the method comprising:
   receiving at a server apparatus the packetized multi-media data from a signal source, the packetized multi-media data having synchronizing information;
   synchronizing a server clock to a clock associated with the signal source in response to the synchronizing information;
   generating first time stamps in response to the receipt of the packetized multi-media data, each one of the first time stamps being indicative of a time a respective multi-media data packet is received at the server apparatus;
   generating data frames having the packetized multi-media data and the first time stamps included therein; and
   placing the data frames on the asynchronous network to transmit the data frames to a client device, wherein a second time stamp is generated and placed in each one of the data frames prior to transmitting the data frames to the client device, each one of the first time stamps being indicative of a time the respective data frame is placed on the asynchronous network, wherein the client device controls a data flow rate in the client device to correspond to a rate that the packetized multi-media data is received at the server apparatus in response to the first time stamps and synchronizes a clock associated with the client device to the server clock in response to the second time stamps.

10. The method according to claim 9, wherein the client device adds a third time stamp to each one of the data frames, the third time stamp being indicative of a time the respective data frame arrives at the client device, the client device comparing the second time stamps with the third time stamps to synchronize the clock associated with the client device with the server clock.

11. An apparatus for processing data frames received over an asynchronous network, the apparatus comprising:
   an input, coupled to the asynchronous network, for receiving the data frames transmitted by a server device, wherein the server device receives packetized multi-media data including synchronizing information from a signal source, synchronizes a clock associated with the server device to a clock associated with the signal source in response to the synchronizing information and generates the data frames having the packetized multi-media data and first and second time stamps included therein, the first time stamps beings indicative of times respective multi-media data packets are received at the server device and the second time stamps being indicative of times the respective data frames are placed on the asynchronous network;
   a time stamp device, coupled to the input, for generating third time stamps indicative of times the respective data frames are received at the input;
   a clock;
   a decoder;
   a controller, coupled to the clock and the time stamp device, for controlling a rate that the packetized multi-media data is transferred to the decoder to correspond to a rate that the packetized multi-media data is received at the server device in response to the first time stamps and synchronizing the clock to the clock associated with the server device in response to the second time stamps and the third time stamps.

12. The apparatus according to claim 11, wherein the controller synchronizes the clock to the clock associated with the server device by comparing the second time stamps to the third time stamps and controlling a frequency of the clock based on the comparisons.

13. The apparatus according to claim 12, wherein the asynchronous network is an Ethernet network.

14. The apparatus according to claim 12, wherein the asynchronous network is an HPNA network.

15. The apparatus according to claim 12, wherein the asynchronous network is a PLC network.

16. The apparatus according to claim 12, wherein the asynchronous network is a wireless network.

17. A method for controlling a client device in response to receiving data frames over an asynchronous network, the method comprising:

receiving the data frames transmitted by a server device at the client device, wherein the server device receives packetized multi-media data including synchronizing information from a signal source, synchronizes a clock associated with the server device to a clock associated with the signal source in response to the synchronizing information and generates the data frames having the packetized multi-media data and first and second time stamps included therein, the first time stamps being indicative of times respective multi-media data packets are received at the server device and the second time stamps being indicative of times the respective data frames are placed on the asynchronous network;

generating third time stamps at the client device upon receipt of the data frames, each of the third time stamps being indicative of a time a respective one of the data frames is received by the client device over the asynchronous network;

controlling a rate that the packetized multi-media data is transferred to a decoder of the client device to correspond to a rate that the packetized multi-media data is received at the server device in response to the first stamps; and synchronizing a clock associated with the client device to the clock associated with the server device in response to the second time stamps and the third time stamps.

18. The method according to claim 17, wherein the clock associated with the client device is synchronized to the clock associated with the server device by comparing the second time stamps to the third time stamps and controlling a frequency of the clock associated with the client device based on the comparisons.

* * * * *